US009613029B2

(12) United States Patent
Yang et al.

(10) Patent No.: US 9,613,029 B2
(45) Date of Patent: Apr. 4, 2017

(54) TECHNIQUES FOR TRANSLITERATING INPUT TEXT FROM A FIRST CHARACTER SET TO A SECOND CHARACTER SET

(75) Inventors: Fan Yang, Beijing (CN); Kirill Buryak, Sunnyvale, CA (US); Feng Yuan, Beijing (CN); Baohua Liao, Beijing (CN)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/381,395

(22) PCT Filed: Feb. 28, 2012

(86) PCT No.: PCT/CN2012/071714
§ 371 (c)(1),
(2), (4) Date: Sep. 4, 2014

(87) PCT Pub. No.: WO2013/127060
PCT Pub. Date: Jun. 9, 2013

(65) Prior Publication Data
US 2015/0088487 A1    Mar. 26, 2015

(51) Int. Cl.
*G06F 17/28* (2006.01)
*G06F 17/21* (2006.01)

(52) U.S. Cl.
CPC .......... *G06F 17/289* (2013.01); *G06F 17/21* (2013.01); *G06F 17/2863* (2013.01)

(58) Field of Classification Search
None
See application file for complete search history.

(56) References Cited

U.S. PATENT DOCUMENTS

| 8,996,356 B1* | 3/2015 | Yang | G06F 3/0237 704/1 |
| 2005/0216253 A1* | 9/2005 | Brockett | G06F 17/2818 704/5 |

(Continued)

FOREIGN PATENT DOCUMENTS

| CN | 101697109 A | 4/2010 |
| CN | 102193639 A | 9/2011 |

OTHER PUBLICATIONS

PCT International Search Report and Written Opinion dated Nov. 29, 2012 for PCT International Application No. PCT/CN2012/071714, 12 pages.

*Primary Examiner* — Pierre-Louis Desir
*Assistant Examiner* — Jonathan Kim
(74) *Attorney, Agent, or Firm* — Remarck Law Group PLC (57) ABSTRACT

Computer implemented techniques for performing transliteration of input text in a first character set to a second character set are disclosed. The techniques include receiving input text and determining a set of possible transliterations of the input text based on a plurality of mapping standards. Each mapping standard defines a mapping of characters in the first character set to characters in the second character set. The techniques further include determining a set of candidate words in the target language based on the possible transliterations and a text corpus. The techniques also include determining a likelihood score for each one of the candidate words based on a language model in the target language previously received words. The techniques also include providing one or more candidate words based on the likelihood scores and receiving a user selection indicating one of the candidate words.

18 Claims, 4 Drawing Sheets

(56) References Cited

U.S. PATENT DOCUMENTS

| | | | |
|---|---|---|---|
| 2006/0143207 A1* | 6/2006 | McQuaid | G06F 17/2223 |
| 2007/0055493 A1* | 3/2007 | Lee | G06F 17/289 |
| | | | 704/9 |
| 2008/0221866 A1* | 9/2008 | Katragadda | G06F 17/2223 |
| | | | 704/8 |
| 2008/0262828 A1* | 10/2008 | Och | G06F 17/2818 |
| | | | 704/3 |
| 2009/0070095 A1* | 3/2009 | Gao | G06F 17/2827 |
| | | | 704/2 |
| 2010/0017382 A1* | 1/2010 | Katragadda | G06F 17/30976 |
| | | | 706/12 |
| 2011/0040552 A1* | 2/2011 | Van Guilder | G06F 17/246 |
| | | | 704/4 |
| 2011/0090151 A1 | 4/2011 | Huang et al. | |
| 2011/0099000 A1* | 4/2011 | Rai | G06F 17/2223 |
| | | | 704/2 |
| 2011/0137635 A1* | 6/2011 | Chalabi | G06F 17/2863 |
| | | | 704/2 |
| 2011/0218796 A1* | 9/2011 | Suzuki | G06F 17/28 |
| | | | 704/2 |
| 2011/0238407 A1* | 9/2011 | Kent | G06F 17/289 |
| | | | 704/3 |
| 2012/0041751 A1* | 2/2012 | Elfeky | G06F 17/2223 |
| | | | 704/2 |
| 2012/0239834 A1* | 9/2012 | Davtchev | G06F 17/273 |
| | | | 710/67 |
| 2013/0035926 A1* | 2/2013 | Ushakov | G06F 17/28 |
| | | | 704/2 |

\* cited by examiner

TECHNIQUES FOR TRANSLITERATING INPUT TEXT FROM A FIRST CHARACTER SET TO A SECOND CHARACTER SET

CROSS-REFERENCE TO RELATED APPLICATIONS

This application is a 371 U.S. National Stage of International Application No. PCT/CN2012/071714, filed Feb. 28, 2012. The disclosure of the above application is incorporated herein by reference in its entirety.

FIELD

The present disclosure relates to user devices and, more particularly, to techniques for performing transliteration of text input in a first character set to a second character set, the second character set corresponding to a target language.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user may input information, e.g., text, to a user device via an input device such as a keyboard. Many keyboards, however, are constrained to a single character set, e.g., a Latin-based character set. Further, due to size constraints, however, many user devices, e.g., mobile user devices, may include a partial QWERTY-based physical keyboard that are constrained to a single character set. Additionally or alternatively, user devices may include touch displays, e.g., capacitive sensing displays, which both display information to the user and receive input from the user. For example, these user devices may display a character layout to the user similar to the partial QWERTY-based keyboard. In many instances, the input devices, e.g., such as keyboards and displayed keyboards, may only support Latin-based characters.

As user devices are used throughout the world and by users who speak different languages, users may be unable to input text to the user device in a character set corresponding to their respective languages. In response, users have developed different techniques for transliterating words in their respective language to the Latin-based characters. Namely, a user can enter text in Latin-based characters to represent characters corresponding to the user's language, e.g., characters in a first character set map to characters in a second set. Over time these mappings have been adopted into different mapping standards. It should be appreciated, however, that different mapping standards that map characters in a first character set to characters in a second character may have variations and inconsistencies.

SUMMARY

Further areas of applicability of the present disclosure will become apparent from the detailed description provided hereinafter. It should be understood that the detailed description and specific examples are intended for purposes of illustration only and are not intended to limit the scope of the disclosure.

According to some aspects of the disclosure, techniques for performing transliteration of input text are disclosed. The techniques can include receiving, at a computing device having one or more processors, input text in a first character set and determining, at the computing device, a set of possible transliterations of the input text based on a plurality of mapping standards. Each possible transliteration of the set of possible transliterations corresponds to a transliteration of the input text into a second character set corresponding to a target language. Each mapping standard of the plurality of mapping standards defines a mapping of characters in the first character set to characters in the second character set. Each mapping standard has an associated transliteration probability, each transliteration probability being indicative of a likelihood that its corresponding mapping standard is appropriate for transliterating the input text to the second character set. The techniques further include determining a transliteration score for each of the possible transliterations based on the transliteration probabilities, the transliteration score being indicative of a likelihood that its corresponding possible transliteration is an accurate transliteration of the input text. The techniques also include determining, at the computing device, a set of candidate words in the target language based on the set of possible transliterations and a text corpus of the target language. The set of candidate words includes words in the text corpus that match one of the set of possible transliterations, are similar to one of the set of possible transliterations, and sound similar to one of the set of possible transliterations. The techniques further include determining, at the computing device, a likelihood score for each one of the set of candidate words based on a language model in the target language and one or more previous words received, each likelihood score being indicative of a probability that a corresponding candidate word corresponds to the input text. The techniques also include providing, from the computing device, one or more candidate words of the set of candidate words based on the likelihood scores and receiving a user selection indicating one of the candidate words. The techniques also include determining, at the computing device, a particular mapping standard of the plurality of mapping standards on which the selected candidate word was based, and adjusting, at the computing device, the transliteration probabilities based on the determination of the particular mapping standard.

In another aspect of the disclosure, techniques for performing transliteration of input text are disclosed. The techniques include receiving, at a computing device having one or more processors, input text in a first character set, and determining, at the computing device, a set of possible transliterations of the input text based on a plurality of mapping standards, each possible transliteration of the set of possible transliterations corresponding to a transliteration of the input text into a second character set corresponding to a target language. Each mapping standard of the plurality of mapping standards defines a mapping of characters in the first character set to characters in the second character set. The techniques further include determining, at the computing device, a set of candidate words in the target language based on the set of possible transliterations and a text corpus of the target language, the text corpus corresponding to a set of known words in the target language. The techniques further include determining, at the computing device, a likelihood score for each one of the set of candidate words based on a language model in the target language and one or more previous words received, each likelihood score being indicative of a probability that a corresponding candidate word corresponds to the input text. The techniques also include providing, from the computing device, to a user device one or more candidate words of the set of candidate words based on the likelihood scores and receiving, at the computing device, a user selection indicating one of the candidate words.

In some embodiments of the techniques described above, each mapping standard has an associated transliteration probability, each transliteration probability being indicative of a likelihood that its corresponding mapping standard is appropriate for transliterating the input text to the second character set.

In some embodiments, the techniques described above further include determining, at the computing device, a transliteration score for each of the possible transliterations based on the transliteration probabilities, the transliteration score being indicative of a likelihood that its corresponding possible transliteration is an accurate transliteration of the input text. Providing the one or more candidate words is further based on the transliteration scores.

In some embodiments, the techniques described above further include determining, at the computing device, a particular mapping standard of the plurality of mapping standards on which the selected candidate word was based, and adjusting, at the computing device, the transliteration probabilities based on the determination of the particular mapping standard.

In some embodiments of the techniques described above, the text corpus includes at least one dictionary listing a plurality of words in the target language.

In some embodiments, the techniques described above further include determining a degree of similarity between one of the possible transliterations and one of the words in the text corpus and selectively including the one word in the set of candidate words based on the degree of similarity.

In some embodiments of the techniques described above, determining the set of candidate words further comprises including words in the text corpus that sound similar to one or more of the possible transliterations in the set of candidate words.

In some embodiments of the techniques described above, the words that sound similar to one or more possible transliterations are determined by a Soundex algorithm.

In some embodiments of the techniques described above, the language model is a Hidden Markov Model.

In some embodiments of the techniques described above, the user device is the computing device.

In another aspect of the disclosure, techniques for performing transliteration of input text are disclosed. The techniques include an input device that receives user input indicating input text in a first character set, and a transliteration determination module configured to receive the input text and determine a set of possible transliterations of the input text based on a plurality of mapping standards and the input text. Each possible transliteration of the set of possible transliterations corresponds to a transliteration of the input text into a second character set corresponding to a target language. Each mapping standard of the plurality of mapping standards defines a mapping of characters in the first character set to characters in the second character set. The techniques further include a candidate word determination module configured to determine a set of candidate words in the target language based on the set of possible transliterations and a text corpus of the target language, the text corpus corresponding to a set of known words in the target language. The techniques further include a word selection module configured to determine a likelihood score for each candidate in the set of candidate words based on a language model in the target language and one or more previous words received, each likelihood score being indicative of a probability that its corresponding candidate word corresponds to the input text. The word selection module is further configured to provide one or more candidate words of the set of candidate words based on the likelihood scores of the one or more candidate words, and receive a user selection indicating one of the candidate words.

In some embodiments of the techniques described above, each mapping standard has an associated transliteration probability, each transliteration probability being indicative of a likelihood that its corresponding mapping standard is appropriate for transliterating the input text to the second character set.

In some embodiments of the techniques described above, the transliteration determination module is further configured to determine a transliteration score for each of the possible transliterations based on the transliteration probabilities, the transliteration score being indicative of a likelihood that its corresponding possible transliteration is an accurate transliteration of the input text. Providing the one or more candidate words is further based on the transliteration scores.

In some embodiments, the techniques described further include a feedback module that is configured to determine a particular mapping standard of the plurality of mapping standards on which the selected candidate word was based, and adjust the transliteration probabilities based on the determination of the particular mapping standard.

In some embodiments of the techniques described above, the text corpus includes at least one dictionary listing a plurality of words in the target language.

In some embodiments of the techniques described above, the candidate word determination module is further configured to include determine a degree of similarity between one of the possible transliterations and one of the words in the text corpus and selectively include the one word in the set of candidate words based on the degree of similarity.

In some embodiments of the techniques described above, the candidate word determination module is further configured to include words in the text corpus that sound similar to one or more of the possible transliterations in the set of candidate words.

In some embodiments of the techniques described above, the words that sound similar to one or more possible transliterations are determined by a Soundex algorithm.

In some embodiments of the techniques described above, the language model is a Hidden Markov Model.

BRIEF DESCRIPTION OF THE DRAWINGS

The present disclosure will become more fully understood from the detailed description and the accompanying drawings, wherein.

DETAILED DESCRIPTION

Figure 1:
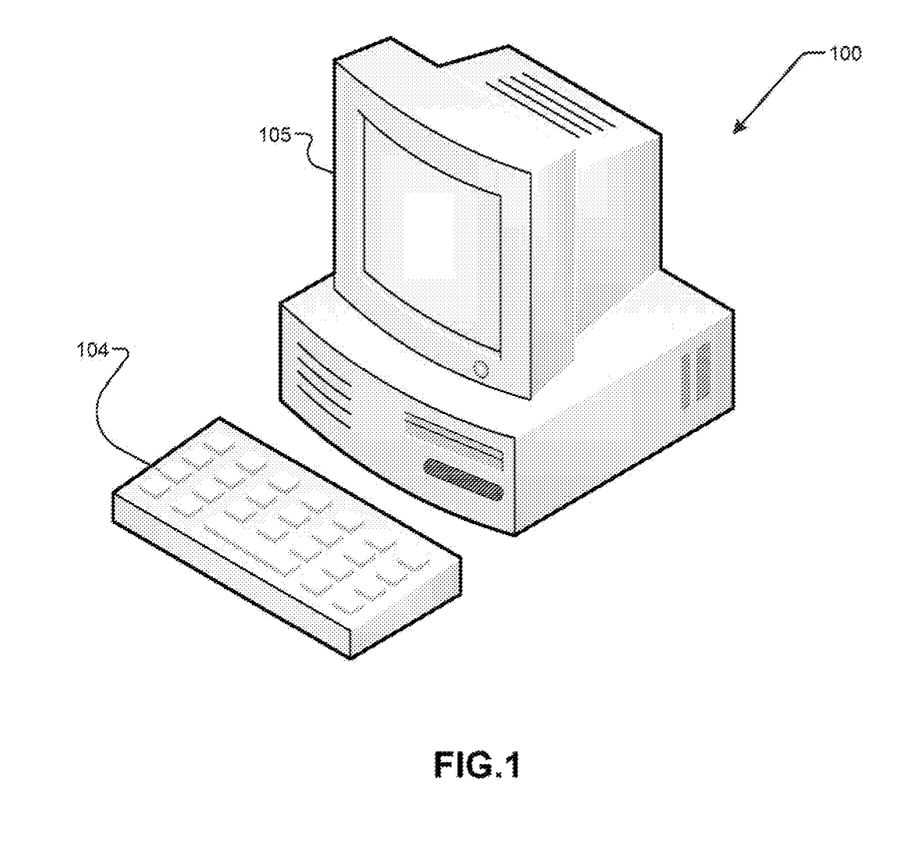
FIG. 1 illustrates an example of a user interacting with a user device according to some implementations of the present disclosure.

Referring now to FIG. 1, an example of a user device 100 is shown. As shown, the user device 100 may be a non-portable computing device having an input device 104, e.g., a QWERTY-based keyboard or partial QWERTY-based keyboard, and a display device 105, e.g., a monitor. The user device 100, however, may also be a mobile user device such as a mobile phone, a laptop computer, or a tablet computer, which can include a touch display 104 or a partial QWERTY-based keyboard layout. The display device 105 may display information to a user and the input device 104 may receive input from the user. For example, the user may input information to the user device 100 by typing on the input device 104.

User devices, such as the user device 100 of FIG. 1, are widely available and thus may be used in many different countries throughout the world. Therefore, user devices may be configured to display information to a user in a variety of different languages and different sets of characters. Input method editors, or IMEs, are software applications that allow a user to input different languages to a user device. Many languages have writing systems that are based on the Latin alphabet, e.g., English, Spanish, and French. There are many other languages, however, that have writing systems based on different alphabets. For example, Russian, Bulgarian, Ukrainian, and Polish are written in Cyrillic. Furthermore, languages such as Arabic, Hebrew, Urdu are written in corresponding alphabets. Moreover, some languages such as Chinese, may be written in non-alphabet based characters.

Many input devices 104 of user devices 100 may be configured to receive input in a Latin-based alphabet to users for input. For example, many QWERTY-based keyboards are only Latin-based. As should be appreciated, users may wish to provide text in languages which do not utilize a Latin-based alphabet or have characters that expand on the Latin-based alphabet, e.g., Vietnamese. To do so, IMEs can be configured to perform transliteration of input text provided in a first character set to output text in a second character set, the second character set corresponding to a target language of the output text. For example, a user may provide phonetic spellings of Russian words in the Latin-based alphabet, and the IME may transliterate the input text to output text displayed in the Cyrillic alphabet.

To perform transliteration, the IME may utilize one or more mapping standards to convert the input text from a first character set, e.g., Latin-based, to a second character set, e.g., Cyrillic, Hebrew, Arabic, or Chinese. A mapping standard can be a transliteration table that defines mappings from characters in the first character set to characters in a second set. Further, there may be more than one mapping standard defining mappings of characters in the first character set to characters in the second character set. For instance, there are at least four different mapping standards for transliterating Latin-based characters to Cyrillic characters. These mapping standards include the Library of Congress standard, the Board of Geographic Names standard, the 13652-78 standard, and the 16876-71 standard. These mapping standards have been provided below in Table I for example only.

TABLE I

| Cyrillic Letter | 16876-71 | 1362-78 | Board of Geographic Names | Library of Congress | Other Variants |
|---|---|---|---|---|---|
| А | A | A | A | A | |
| Б | B | B | B | B | |
| В | V | V | V | V | W |

TABLE I-continued

| Cyrillic Letter | 16876-71 | 1362-78 | Board of Geographic Names | Library of Congress | Other Variants |
|---|---|---|---|---|---|
| Г | G | G | G | G | H, GU |
| Д | D | D | D | D | |
| Е | E | E | E, YE | E | JE, IE |
| Ё | JO | JO | E, YE | E | YO |
| Ж | ZH | ZH | ZH | ZH | G, J |
| З | Z | Z | Z | Z | S |
| И | I | I | I | I | Y |
| Й | JJ | J | Y | I | |
| К | K | K | K | K | C, CH |
| Л | L | L | L | L | |
| М | M | M | M | M | |
| Н | N | N | N | N | |
| О | O | O | O | O | |
| П | P | P | P | P | |
| Р | R | R | R | R | |
| С | S | S | S | S | C |
| Т | T | T | T | T | TH |
| У | U | U | U | U | |
| Ф | F | F | F | F | PH |
| Х | KH | KH | KH | KH | H |
| Ц | C | C | TS | TS | TZ |
| Ч | CH | CH | CH | CH | 4 |
| Ш | SH | SH | SH | SH | CH, W |
| Щ | SHH | SHH | SHCH | SHCH | SCH, TSH, WW, XH |
| Ъ | " | " | " | " | |
| Ы | Y | Y | Y | Y | I, YI |
| Ь | ' | ' | ' | ' | |
| Є, Э | EH | EH | E | E | YE |
| Ю | JU | JU | YU | IU | U |
| Я | JA | JA | YA | IA | A |

Many of the mappings defined by the different mapping standards maybe the same. For example, many of the Latin to Cyrillic mapping standards map "B" to "Б" and "P" to "П." The mapping standards, however, will have some variance between one another. For example, the Library of Congress mapping standard maps the characters "TS" to "Ц," while the 16876-71 standard maps "C" to "Ц." In some situations, a user of an IME may be more comfortable with a first mapping standard, while the IME implements a second mapping standard. In these situations, the IME may misinterpret input text.

Furthermore, the mapping standards themselves may include ambiguities. For instance, according to the Library of Congress mapping standard (Latin to Cyrillic) the character "T" maps to "T" and "S" maps to "C." The Library of Congress mapping standard, however, also maps "TS" to "Ц." Thus, if a user enters "TS," the IME may unable to determine whether the user intended to enter "TC" or "Ц."

Moreover, many languages contain homographs and homonyms. Homonyms are words that sound alike but have different meanings. Homonyms can include homophones, which are words that sound alike, but have different spellings, e.g., break and brake. As transliterations are based on phonetic sounds of letters and substitutions of characters from one character set with characters from another character set, an IME may misinterpret an input text when the user enters text that can correspond to two or more different words.

Accordingly, techniques are presented for improving accuracy of transliterations. While many of the examples provided herein reference transliteration from a Latin-based character set to a Cyrillic character set, the techniques disclosed herein are applicable to many different character sets, including but not limited to, Arabic, Hebrew, Chinese, Japanese, Korean, Urdu, Hindi, and Turkish. Additionally, while a non-portable user device is shown, the techniques may be applied to any suitable user device, including mobile devices.

Figure 2:
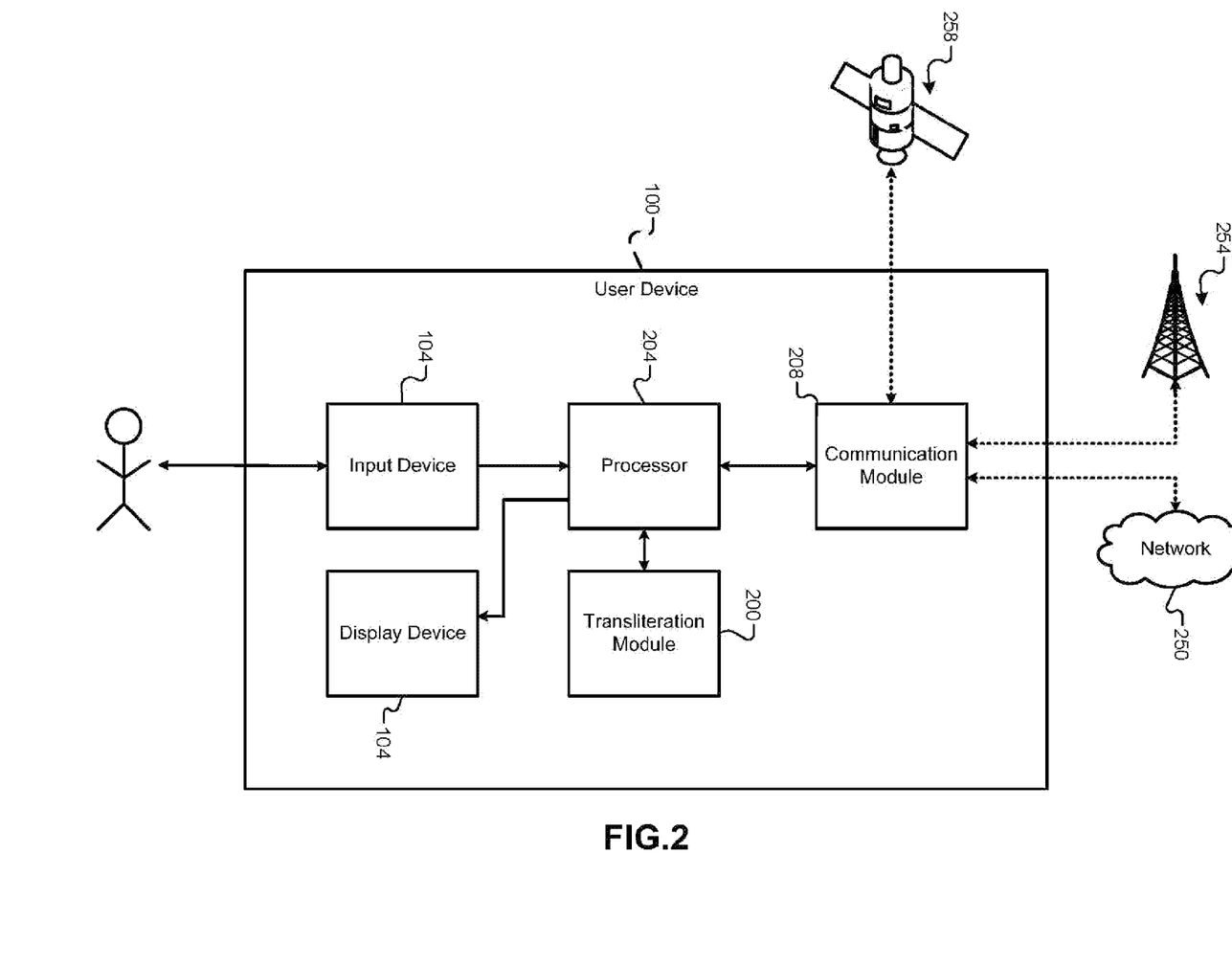
FIG. 2 is a functional block diagram of a user device of FIG. 1 according to some implementations of the present disclosure.

Referring now to FIG. 2, an example of the user device 100 is shown in more detail. The user device 100 may include an input device 104, a display device 105, a processor 204, a transliteration module 200, and a communication module 208. As previously described, the user device 100 may alternatively include a touch display (not shown) which acts as an input device 104 and the display device 105 It is appreciated that while an input display 104 and display device 105 are shown and described, the technique described herein are equally applicable to touch displays and the application thereof is within the scope of this disclosure.

The processor 204 can execute an operating system of the user device 100 as well as other applications implemented on the user device 100. One such application that may be part of the operating system, or may be otherwise executed by the operating system, is the IME of the user device 100. The processor 204 can receive user input via the input device 104. The operating system executed by the processor 204 can interpret the user input. In many applications, the operating system can determine that the user is entering text. In these scenarios, the IME of the user device 100 can interpret the text to determine what to output on the display device 105 and/or to communicate to another device (not shown).

The transliteration module 200 can receive input text to be transliterated from a first character set to a second character set corresponding to a target language. The transliteration module 200 be implemented as a part of the operating system, and/or the IME, or can be implemented as a stand-alone application. Furthermore, the functionality of the transliteration module 200 can be executed in whole or in part by the processor 204.

The communication module 208 controls communication between the user device 100 and other devices. For example only, the communication module 208 may provide for communication between the user device 100 and other users associated with the user and/or a network. The user device 100 may typically communicate via one or more of three communication mediums: a computing network 250, e.g., the Internet (hereinafter "the network 250"), a mobile telephone network 254, and a satellite network 258. Other communication mediums may also be implemented. For example, the communication module 208 may be configured for both wired and wireless network connections, e.g., radio frequency (RF) communication.

Figure 3:
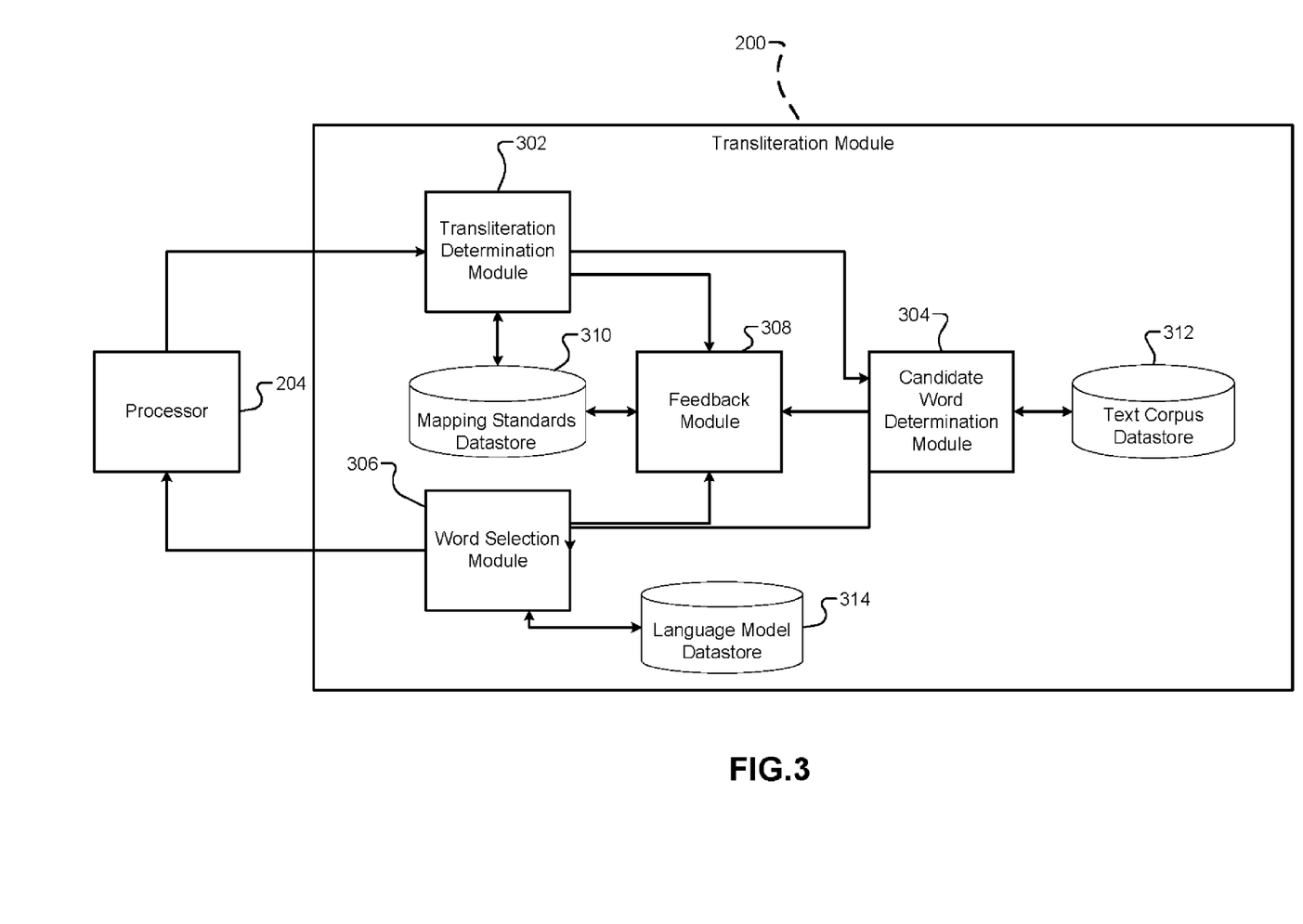
FIG. 3 is a functional block diagram of an example of a transliteration module according to some implementations of the present disclosure.

Referring now to FIG. 3, an example of the transliteration module 200 is shown. The transliteration module 200 can be configured to receive input text from the input device 104 and to perform transliteration of the text from a first character set to a second character set, the second character set corresponding to a target language. The transliteration module 200 may include a transliteration determination module 302, a candidate word determination module 304, a word selection module 306, a feedback module 308, a mapping standards datastore 310, a text corpus datastore 312, and a language model datastore 314.

The transliteration determination module 302 can be configured to receive input text from the processor 204 and to determine a set of possible transliterations of the input text based on a plurality of mapping standards and the input text.

The transliteration determination module 302 can retrieve the plurality of mapping standards from the mapping standards database 310.

The mapping standards datastore 310 can store the plurality of different mapping standards. As discussed above, a mapping standard defines a mapping of characters in a first character set to characters in a second character set. It should be appreciated that the mapping standards datastore 310 can be preloaded with a plurality of mapping standards for transliterating input text to many different languages. Alternatively, the user can select specific languages or character sets to which text is to be transliterated, e.g., Latin-based to Cyrillic, such that the mapping standards corresponding to the user's preferred language can be obtained from a remote server (not shown).

The transliteration determination module 302 can generate a set of possible transliterations based on the retrieved mapping standards and the input text. For each mapping standard, the transliteration determination module 302 can generate at least one possible transliteration according to the mapping standard by substituting characters in the second character set, e.g., Cyrillic, for characters in the first character set, e.g., Latin-based. For example, if the user enters the text "TSIST," the transliteration determination module 302 may determine that according to the Library of Congress and Board of Geographic Names mapping standards, the input text may be transliterated to "ЦИСТ" or "ТСИСТ" as "TS" can map to "Ц," while "T" and "S" map to "Т" and "С" respectively. In response to the input text of "TSIK" the transliteration determination module 302 can include both "ЦИСТ" and "ТСИСТ" as possible transliterations in the set of possible transliterations. Furthermore, according to the 16876-71 and 1362-78 standards, the input text "TSIK" would map only to "ТСИСТ."

It should be appreciated that the transliteration determination module 302 can remove duplicate entries or can indicate a count of how many times a duplicate possible transliteration was determined based on the input text. For instance, in the example above, the possible transliteration "ЦИ ст" was determined twice and "ТСИ ст" was determined four times. Additionally, the transliteration determination module 302 can indicate which mapping standards were used to generate each of the possible transliterations. For example, the transliteration determination module 302 can indicate that "ЦИ ст" was determined using the Library of Congress Standard and the Board of Geographic Names standard, while "ТСИ ст" was determined using any of the four mapping standards.

In some embodiments, each mapping standard may have an associated transliteration probability. A transliteration probability associated to a particular mapping standard may be indicative of a likelihood that its corresponding mapping standard is appropriate for transliterating the input text to the second character set. For example, if the mapping standards define mappings of Latin-based characters to Cyrillic characters and include the Library of Congress standard, the Board of Geographic Names standard, the 13652-78 standard, and the 16876-71 standard, each mapping standard may be initially assigned a probability based on the relative popularity of the mapping standard, e.g., P(Library of Congress)=0.7, P(Board of Geographic Names)=0.2, P(13652-78)=0.06, and P(16876-71)=0.04. In these embodiments, each possible transliteration determined by the transliteration determination module 302 can be assigned a transliteration score based on the transliteration probabilities of the mapping standards used to determine the possible transliteration. The transliteration score of a possible transliteration may be indicative of a likelihood that its corresponding possible transliteration is an accurate transliteration of the input text. As will be discussed in further detail below, the feedback module 308 can monitor the user's tendencies to adjust the probabilities associated to the mapping standards such that the mapping standards that the user utilizes more often have a higher associated transliteration probability.

The candidate word determination module 304 can be configured to receive the set of possible transliterations and to determine a set of candidate words in the target language based on the set of possible transliterations and a text corpus of the target language. The text corpus of the target language corresponds to a set of known words in the target language. As should be appreciated, the set of possible transliterations can include strings of characters that are not words. Such a scenario may arise from, for example, a user mistyping the input text or a possible transliteration being determined from a non-intended mapping standard. In the example provided above, the user may enter the text "TSIST," which can result in the possible transliterations "ЦИст" and "тсИст." The string of characters ""ЦИст" means "cysts" in Russian, while the string of characters "тсИст" has no meaning in Russian. Thus, the candidate word determination module 304 can compare both "ЦИст" and "тсИст" to the words in the Russian text corpus to determine that "ЦИст" is an actual word in Russian. Therefore, "ЦИст" would be included in the set of candidate words. The candidate word determination module 304 can compare each possible transliteration to the text corpus to determine the set of candidate words.

In some embodiments, the text corpus may be stored in the text corpus datastore 312. The text corpus can include a collection of one or more dictionaries in the target language. Furthermore, the text corpus can include words that are found on a collection of webpages and that are in the target language. It should be appreciated that the words found in the text corpus may be obtained from any suitable source.

The candidate word determination module 304 can analyze each possible transliteration in relation to the text corpus. If a possible transliteration is found in the text corpus, the candidate word determination module 304 can include the possible transliteration in the set of candidate words.

If a possible transliteration does not match any of the words in the text corpus, the candidate word determination module 304 can determine whether the possible transliteration is similar to any of the words found in the text corpus. The candidate word determination module 304 can determine a degree of similarity between the possible transliteration and a word found in the text corpus. The candidate word determination module 304 can determine whether to include the word in the set of candidate words based on the degree of similarity. For instance, if the possible transliteration differs from one of the words in the text corpus by one character, the candidate word determination module 304 can include the similar word in the set of candidate words. Similarly, if two or more characters in the possible transliteration can be switched to result in one of the words in the text corpus, the candidate word determination module 304 can include the similar word in the text corpus. It should be appreciated that the candidate word determination module 304 can implement auto-correct and/or spelling correction techniques to determine the set of candidate words from the set of possible transliterations.

The candidate word determination module 304 can be further configured to include words that sound similar to one or more of the possible transliterations. For each possible transliteration, the candidate word determination module 304 can execute a phonetic algorithm, such as a Soundex algorithm, to determine one or more words in the text corpus that sound similar to the possible transliteration. For example, each word in the text corpus can be represented in its respective Soundex encoding, e.g., the first letter of the word followed by three numerical digits representing consonants in the words. The candidate word determination module 304 can generate a Soundex encoding of a possible transliteration is generated and compared it with the Soundex encodings of the words in the text corpus. Any word in the text corpus that has a Soundex encoding that matches the Soundex encoding of the possible transliteration can be included in the set of candidate words.

In some scenarios, the user may intend for a particular input text not to be transliterated. For example, the user may be inputting a trade name in English and may not wish to have the term transliterated into the second character set. Thus, in some embodiments, the candidate word determination module 304 can further compare the input text with a text corpus in the source language of the input text, e.g., one or more dictionaries in the source language. In these embodiments, the candidate word determination module 304 can compare the input text with the text corpus in the source language. If the input text is found in the text corpus in the source language, the input text in the initial set can be included the set of candidate words. As will be described further below, the input text can then be provided to the user for selection with other candidate words.

The candidate word determination module 304 can be further configured to assign priority scores to each candidate word based on how the candidate word was included in set of candidate words. The priority score of a candidate word can indicate the likelihood that the candidate word belongs in the set of candidate words. For example, a first score can be assigned to a candidate word if the candidate word was a possible transliteration that was found in the text corpus. A second score may be assigned to a candidate word if the candidate word was determined as having a similar spelling as the possible transliteration. A third score can be assigned to the candidate word if the candidate word was determined as sounding similar to the possible transliteration. A fourth score can be assigned to the candidate word if the candidate word is not transliterated and remains in the source language. It should be appreciated that the first score can be greater than the second score, the third score, and the fourth score. In some embodiments, the second score can be higher than the third score.

The word selection module 306 can be configured to receive the set of candidate words and to determine a likelihood score for each candidate word in the set of candidate words based on a language model in the target language and one or more previous words determined by the transliteration module 200. The likelihood score of a candidate word can be indicative of a probability that its corresponding candidate word corresponds to the input text.

In some embodiments, the language model for the target language is stored in the language model database 314. In some embodiments, the language model is an N-gram language model. In these embodiments, the language model defines conditional probabilities of each of the candidate words given the previous (N−1) words entered by the user. The language model can be generated off-line or can be continuously updated. In some embodiments, the language model is a Hidden Markov Model. It should be appreciated that the language model database 314 can store language models for the target language or for a plurality of different languages.

Given the set of candidate words and the previous (N−1) words entered by the user, the word selection module 306 can determine the likelihood score of each candidate. The likelihood score of a candidate word can be the probability of the candidate word following the previous (N−1) words given the set of candidate words and the previous (N−1) words.

Once the word selection module 306 has determined the likelihood scores for each of the candidate words, the word selection module 306 can rank the candidate words according to their respective likelihood scores. It should be appreciated that the highest ranking candidate words are the words that most likely correspond to the input text. Furthermore, in some embodiments the word selection module 306 can be configured to multiply the likelihood score of a candidate word by the transliteration score corresponding to the candidate word and/or the priority score of the candidate word. For purposes of explanation, the result of the multiplication can be referred to as a total score of the candidate word. In these embodiments, the candidate words can be ranked according to the total scores of the candidate words.

In some embodiments, the word selection module 306 can be further configured to provide one or more candidate words to a user based on the scores determined by the word selection module 306 and to receive a user selection indicating one of the candidate words. The ranked candidate words can be displayed to a user, e.g., via the display device 105. In some embodiments, the word selection module 306 may only provide the highest ranked candidate words, e.g., the three candidate words with the highest likelihood scores. The user can select the intended candidate word from the displayed candidate words. The selected candidate word can then be included in the output text, which can include the previously entered text.

In some embodiments, the word selection module 306 can be configured to select the candidate word having the highest total score. In these embodiments, the word selection module 306 can rank the candidate words according to the total scores of the set of candidate words. If the highest ranked candidate word has a total score that is greater than the total score of the next-highest ranked candidate word by more than a predetermined magnitude, e.g., 5 times larger, the word selection module 306 can automatically select the highest ranked candidate word.

In some embodiments, the transliteration module 200 may include a feedback module 308. The feedback module 308 can be configured to determine a particular mapping standard of the plurality of mapping standards on which the selected candidate word was based. The feedback module 308 can be further configured adjust the transliteration probabilities based on the determination of the particular mapping standard.

The feedback module 308 can monitor the outputs of the transliteration determination module 302, the candidate word determination module 304, and the word selection module 306 to determine which mapping standard or mapping standards were used to generate the candidate word selected by the user. The feedback module 308 can monitor the transliteration determination module 302 to determine whether the set of possible transliterations includes more than one possible transliteration. If the set of possible transliterations includes more than one possible transliteration, the feedback module 308 can record the mapping standard or mapping standards used to generate each of the possible transliterations.

The feedback module 308 can monitor the candidate word determination module 304 to determine which possible transliterations resulted in candidate words that were entered into the set of candidate words. When the set of possible transliterations includes more than one possible transliteration, the feedback module 308 can determine, for each candidate word, which mapping standard or mapping standards was used to generate the possible transliteration on which the candidate word was based. When the user provides the user selection, the feedback module 308 can then determine the mapping standard or standards on which the user selection was based.

Table II, provided below, illustrates an example of how the feedback module 308 can determine the mapping standard used to generate the candidate word indicated in the user selection:

TABLE II

| Mapping Standards | Possible Transliterations | Candidate Words | User Selection |
|---|---|---|---|
| MS1 | PT1 | CW1, CW2 | CW1 |
| MS2 | PT2 | CW3 | |
| MS3 | PT2 | CW3 | |

In this example, there are three mapping standards that can be used to generate a candidate word in the target language. Based on a received input text in a first character set, the transliteration determination module 302 determines a first possible transliteration PT1 using the first mapping standard, and a second possible transliteration PT2 using the second and third mapping standards. The candidate word determination module 304 receives the possible transliterations and determines that the input text provided by the user can correspond to three candidate words, CW1, CW2, and CW3. In the example, the first candidate word CW1 and the second candidate word CW2 were determined from the first possible transliteration, PT1, while the third candidate word CW3 was determined from the second possible transliteration, PT2. When the user selects CW1 as the desired output text, the feedback module 308 can determine that the mapping standard MS1 was used to generate CW1. If the user had selected CW3, the feedback module 308 could have determined that the second mapping standard MS2 and the third mapping standard MS3 were used to generate the candidate word selected by the user.

Upon determining the mapping standard or mapping standards used to generate the candidate word indicated by the user selection, the feedback module 308 can update the probabilities associated with the determined mapping standard or mapping standards. The feedback module 308 can update the probabilities associated with the mapping standard according to the manner by which the probabilities are initially determined. For example, if the probabilities are based on the total number of user selections, the feedback module 308 can increment the number of user selections and increment the number of times the determined mapping standard has been used. It should be appreciated, however, that the feedback module 308 can update the probabilities in any suitable manner.

The transliteration module 200 described above is provided for example and is not intended to be limiting. Variations of the transliteration module 200 are contemplated and are within the scope of this disclosure. Furthermore, the transliteration module 200, while shown as being implemented at the user device 100, can alternatively be implemented at a transliteration server (not shown). In these embodiments, the user device 100 can provide the input text to the transliteration server, which determines the set of candidate words and provides the set of candidate words to the user device 100. The user device 100 receives the user selection and inserts the selected candidate word in the output text.

Figure 4:
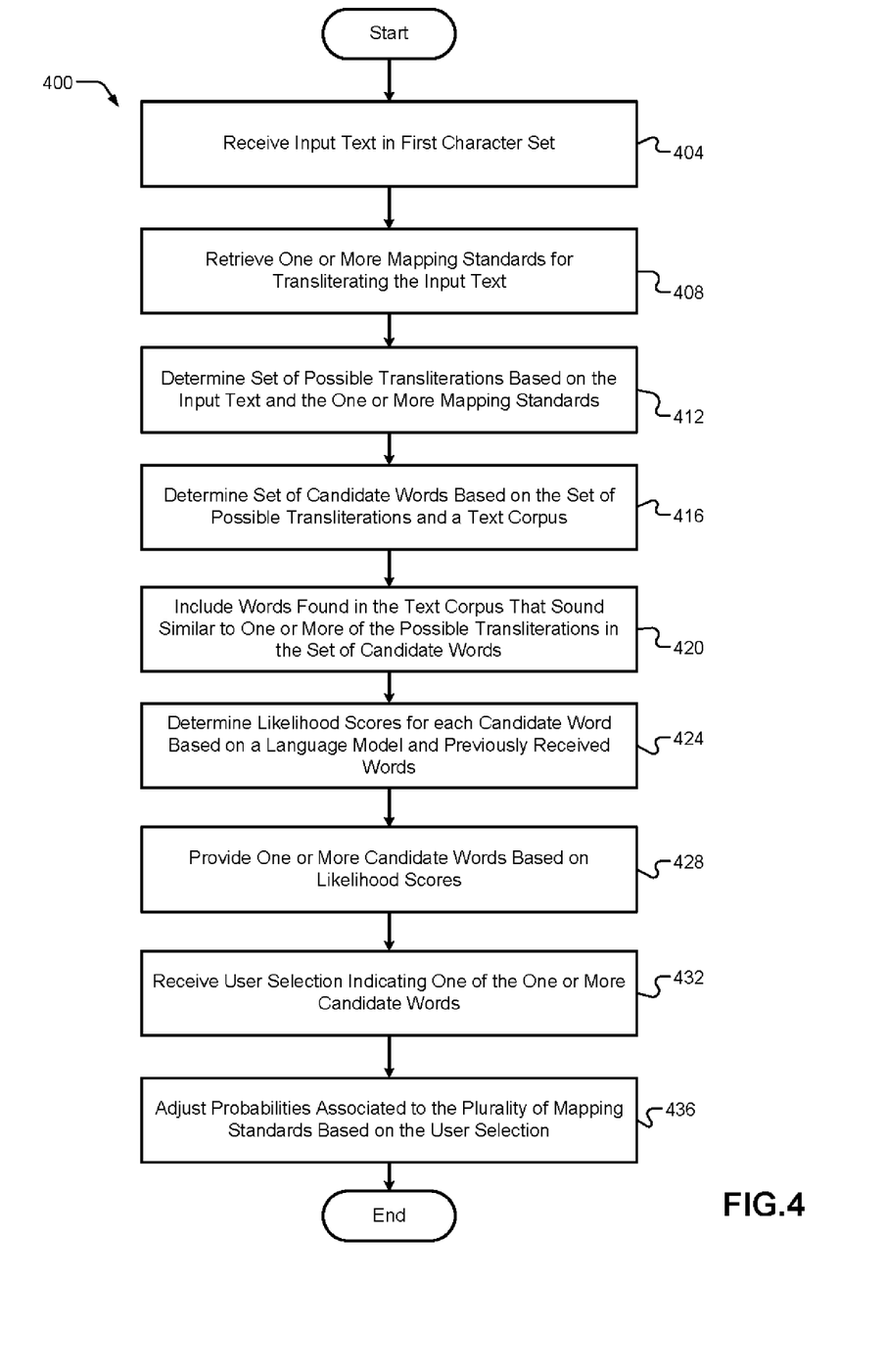
FIG. 4 is a flow diagram of an example of a technique for transliterating text input according to some implementations of the present disclosure.

Referring now to FIG. 4, an example technique 400 for performing transliteration of input text from a first character set to a second character set corresponding to a target language is illustrated. At 404, the transliteration module 200 receives the input text. As described above, the input text can be entered by a user via an input device, e.g., input device 104, of a user device 100. The input text is provided in the first character set, e.g., Latin-based characters. At 408, the transliteration module 200 can retrieve one or more mapping standards that map characters in the first character set to characters in the second character set. At 412, the transliteration module 200 can determine a set of possible transliterations based on the input text and the one or more mapping standards. As described above, the transliteration module 200 can generate a possible transliteration by substituting characters in the second character set for characters in the first character set and which appear in the input text based on the mappings defined in the mapping standard used to generate the possible transliteration. The transliteration module 200 can generate at least one possible transliteration for each mapping standard. Furthermore, the transliteration module 200 can assign a transliteration score to each of the possible transliterations based on which mapping standard was used to generate the possible transliteration.

At 416, the transliteration module 200 can determine a set of candidate words based on the set of possible transliterations and a text corpus of the target language, e.g., one or more dictionaries in the target language. As previously discussed, the transliteration module 200 can compare each of the possible transliterations with the text corpus to determine whether the possible transliteration matches any of the words in the text corpus. If so, the possible transliteration is included in the set of candidate words. If the possible transliteration does not match any of the words in the text corpus, the transliteration module 200 can determine whether the possible transliteration is similar to one or more words in the text corpus, e.g., the possible transliteration is a misspelled word or a word that requires an accent. As described above, the transliteration module 200 can determine a degree of similarity between the possible transliteration and one of the words in the text corpus and selectively include the word in the set of candidate words based on the degree of similarity.

It is noted that in some embodiments, the transliteration module 200 can further compare the input text with a text corpus in the source language of the input text as well.

At 420, the transliteration module 200 can include words found in the text corpus that sound similar to one or more of the possible transliterations in the set of candidate words. As described above, the transliteration module 200 can implement a phonetic algorithm, such as a Soundex algorithm, to determine any words in the text corpus that sound similar to any of the possible transliterations. If the transliteration module 200 identifies one or more words in the text corpus that are similar in sound to one of the possible transliteration, the one or more words are included in the set of candidate words.

At 424, the transliteration module 200 can determine a likelihood score for each one of the set of candidate words based on a language model in the target language and one or more previous words. As described above, the transliteration module 200 can analyze the set of candidate words with respect to an n-gram language model corresponding to the target language. The transliteration module 200 can utilize the language model to determine the probability, or likelihood score, of each one of the candidate words following the (N−1) words entered before the input text. As discussed above, the transliteration module 200 can be further configured to determine a total score for each of the candidate words.

At 428, the transliteration module 200 can provide one or more of the candidate words to the user based on the likelihood scores of the one or more candidate words. As discussed previously, the transliteration module 200 can further base the decision on which candidate words to present to the user based on the total scores of the one or more candidate words. At 432, the transliteration module 200 can receive a user selection indicating one of the one or more candidate words. The user selection is indicative of the word intended by the user in the target language. The candidate word indicated by the user selection can then be inserted in the output text.

At 436, the transliteration module 200 can update the probabilities associated with the mapping standards based on user selection. As described above the transliteration module 200 can determine the mapping standard or mapping standards used to generate the candidate word selected by the user. The transliteration module 200 can adjust the probabilities associated with the mapping standards based on the determination.

The foregoing technique 400 is provided for example only and not intended to be limiting. It should be appreciated that variations of the foregoing technique 400 can be implemented and are within the scope of this disclosure. Furthermore, not all of the stages of the technique are required and additional stages may be performed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
receiving, at a computing device having one or more processors and from a user via a keyboard, input text in a first character set via an input method editor;
determining, at the computing device, a set of possible transliterations of the input text based on a plurality of mapping standards, each possible transliteration of the set of possible transliterations corresponding to a transliteration of the input text into a second character set corresponding to a target language, each mapping standard of the plurality of mapping standards defining a mapping of each and every character in the second character set to one or more characters in the first character set, and each mapping standard having an associated transliteration probability stored for use with the input method editor, each transliteration probability being indicative of a likelihood that its corresponding mapping standard is appropriate for transliterating text from the user in the first character set to the second character set;

determining a transliteration score for each of the possible transliterations based on the transliteration probabilities, the transliteration score being indicative of a likelihood that its corresponding possible transliteration is an accurate transliteration of the input text;

determining, at the computing device, a set of candidate words in the target language based on the set of possible transliterations and a text corpus of the target language, wherein the set of candidate words includes words in the text corpus that match one of the set of possible transliterations, that are similar to one of the set of possible transliterations, and sound similar to one of the set of possible transliterations;

determining, at the computing device, a likelihood score for each one of the set of candidate words based on a language model in the target language and one or more previous words received, each likelihood score being indicative of a probability that a corresponding candidate word corresponds to the input text;

providing, from the computing device, one or more candidate words of the set of candidate words based on the likelihood scores and the transliteration scores;

receiving a user selection indicating one of the candidate words;

monitoring, at the computing device, tendencies of the user by determining a particular mapping standard of the plurality of mapping standards on which the selected candidate word was based; and adjusting, at the computing device, the transliteration probabilities stored for use with the input method editor based on the tendencies of the user as determined from the particular mapping standard.

2. A computer-implemented method comprising:

receiving, at a computing device having one or more processors and from a user via a keyboard, input text in a first character set via an input method editor;

determining, at the computing device, a set of possible transliterations of the input text based on a plurality of mapping standards, each possible transliteration of the set of possible transliterations corresponding to a transliteration of the input text into a second character set corresponding to a target language, each mapping standard of the plurality of mapping standards defining a mapping of each and every character in the second character set to one or more characters in the first character set and each mapping standard having an associated transliteration probability stored for use with the input method editor, each transliteration probability being indicative of a likelihood that its corresponding mapping standard is appropriate for transliterating text from the user in the first character set to the second character set;

determining, at the computing device, a transliteration score for each of the possible transliterations based on the transliteration probabilities, the transliteration score being indicative of a likelihood that its corresponding possible transliteration is an accurate transliteration of the input text;

determining, at the computing device, a set of candidate words in the target language based on the set of possible transliterations and a text corpus of the target language, the text corpus corresponding to a set of known words in the target language;

determining, at the computing device, a likelihood score for each one of the set of candidate words based on a language model in the target language and one or more previous words received, each likelihood score being indicative of a probability that a corresponding candidate word corresponds to the input text;

providing, from the computing device, to a user device one or more candidate words of the set of candidate words based on the likelihood scores, the transliteration probabilities, and the transliteration scores;

receiving, at the computing device, a user selection indicating one of the candidate words;

monitoring, at the computing device, tendencies of the user by determining a particular mapping standard of the plurality of mapping standards on which the selected candidate word was based; and adjusting, at the computing device, the transliteration probabilities stored for use with the input method editor based on the tendencies of the user as determined from the particular mapping standard.

3. The computer-implemented method of claim 2, wherein the text corpus includes at least one dictionary listing a plurality of words in the target language.

4. The computer-implemented method of claim 3, further comprising determining a degree of similarity between one of the possible transliterations and one of the words in the text corpus and selectively including the one word in the set of candidate words based on the degree of similarity.

5. The computer-implemented method of claim 2, wherein determining the set of candidate words further comprises including words in the text corpus that sound similar to one or more of the possible transliterations in the set of candidate words.

6. The computer-implemented method of claim 5, wherein the words that sound similar to one or more possible transliterations are determined by a Soundex algorithm.

7. The computer-implemented method of claim 2, wherein the language model is a Hidden Markov Model.

8. The computer-implemented method of claim 2, wherein the user device is the computing device.

9. The computer-implemented method of claim 2, wherein the input text is in a source language and the method further comprises:
   comparing the input text with a text corpus in the source language; and
   when the input text is found in the text corpus in the source language, including the input text in the set of candidates words.

10. The computer-implemented method of claim 2, wherein the transliteration probabilities are initially assigned based on a relative popularity of each mapping standard.

11. A computing device, comprising:
   a keyboard that receives user input from a user indicating input text in a first character set via an input method editor;
   a transliteration determination module configured to (i) receive the input text and determine a set of possible transliterations of the input text based on a plurality of mapping standards and the input text, each possible transliteration of the set of possible transliterations corresponding to a transliteration of the input text into a second character set corresponding to a target language, each mapping standard of the plurality of mapping standards defining a mapping of each and every character in the second character set to one or more characters in the first character set and each mapping standard having an associated transliteration probability stored for use with the input method editor, each transliteration probability being indicative of a likelihood that its corresponding mapping standard is appropriate for transliterating text from the user in the first character set to the second character set, and (ii) determine a transliteration score for each of the possible transliterations based on the transliteration probabilities, the transliteration score being indicative of a likelihood that its corresponding possible transliteration is an accurate transliteration of the input text;

a candidate word determination module configured to determine a set of candidate words in the target language based on the set of possible transliterations and a text corpus of the target language, the text corpus corresponding to a set of known words in the target language;

a word selection module configured to:
 a) determine a likelihood score for each candidate in the set of candidate words based on a language model in the target language and one or more previous words received, each likelihood score being indicative of a probability that its corresponding candidate word corresponds to the input text,
 b) provide one or more candidate words of the set of candidate words based on the likelihood scores, the transliteration probabilities of the one or more candidate words, and the transliteration scores, and
 c) receive a user selection indicating one of the candidate words; and a feedback module configured to:
 monitor tendencies of the user by determining a particular mapping standard of the plurality of mapping standards on which the selected candidate word was based; and
 adjust the transliteration probabilities stored for use with the input method editor based on the tendencies of the user as determined from the particular mapping standard.

12. The computing device of claim 11, wherein the text corpus includes at least one dictionary listing a plurality of words in the target language.

13. The computing device of claim 12, wherein the candidate word determination module is further configured to determine a degree of similarity between one of the possible transliterations and one of the words in the text corpus and to selectively include the one word based on the degree of similarity.

14. The computing device of claim 11, wherein the candidate word determination module is further configured to include words in the text corpus that sound similar to one or more of the possible transliterations.

15. The computing device of claim 14, wherein the candidate word determination module determines the words that sound similar to one or more possible transliterations based on a Soundex algorithm.

16. The computing device of claim 11, wherein the language model is a Hidden Markov Model.

17. The computing device of claim 11, wherein the input text is in a source language and the candidate word determination module is further configured to:
 compare the input text with a text corpus in the source language; and
 when the input text is found in the text corpus in the source language, include the input text in the set of candidates words.

18. The computing device of claim 11, wherein the transliteration probabilities are initially assigned based on a relative popularity of each mapping standard.

* * * * *